(12) United States Patent
Shirai et al.

(10) Patent No.: US 8,132,477 B2
(45) Date of Patent: Mar. 13, 2012

(54) BALL SCREW DEVICE

(75) Inventors: Takeki Shirai, Tokyo (JP); Yuji Tachikake, Tokyo (JP); Soshi Miyahara, Tokyo (JP); Masahiko Yoshino, Tokyo (JP); Takashi Sakuyama, Tokyo (JP); Lina Teng, Tokyo (JP); Tsutomu Togashi, Tokyo (JP)

(73) Assignee: THK Co., Ltd., Tokyo (JP)

( * ) Notice: Subject to any disclaimer, the term of this patent is extended or adjusted under 35 U.S.C. 154(b) by 525 days.

(21) Appl. No.: 12/294,810

(22) PCT Filed: Mar. 19, 2007

(86) PCT No.: PCT/JP2007/055543
§ 371 (c)(1),
(2), (4) Date: Jun. 22, 2009

(87) PCT Pub. No.: WO2007/114036
PCT Pub. Date: Oct. 11, 2007

(65) Prior Publication Data
US 2010/0242652 A1    Sep. 30, 2010

(30) Foreign Application Priority Data
Mar. 31, 2006    (JP) .................................. 2006-097960

(51) Int. Cl.
*F16H 1/24*    (2006.01)
*F16H 55/02*    (2006.01)
(52) U.S. Cl. ................. 74/424.86; 74/424.87; 74/424.82
(58) Field of Classification Search ................. 74/89.23, 74/424.81, 424.82, 424.83, 424.84, 424.86, 74/424.87; 384/451
See application file for complete search history.

(56) References Cited

U.S. PATENT DOCUMENTS

| 439,877 | A | * | 11/1890 | Howard ........................ 384/451 |
| 2,924,113 | A | * | 2/1960 | Orner .......................... 74/424.86 |
| 3,176,535 | A | * | 4/1965 | Rowland ..................... 74/424.83 |
| 3,367,201 | A | * | 2/1968 | Orner .......................... 74/424.86 |
| 2007/0137350 | A1 | * | 6/2007 | Tateishi et al. ............. 74/424.87 |
| 2007/0196189 | A1 | * | 8/2007 | Sugita ............................. 409/65 |

FOREIGN PATENT DOCUMENTS

| JP | 49-93767 A | 9/1974 |
| JP | 63-57956 A | 3/1988 |
| JP | 2005-3106 A | 1/2005 |
| JP | 2005-42796 A | 2/2005 |
| JP | 2006-38099 A | 2/2006 |
| JP | 2006-038099 A | 2/2006 |

* cited by examiner

OTHER PUBLICATIONS

International Search Report of PCT/JP2007/055543, date of mailing Jun. 19, 2007.

*Primary Examiner* — Justin Krause
(74) *Attorney, Agent, or Firm* — Westerman, Hattori, Daniels & Adrian, LLP

(57) ABSTRACT

A ball screw device having a novel ball circulation structure suitable for a screw shaft with a large lead, optimum for downsizing and weight saving of a nut member, capable of being manufactured at low cost, and capable of exhibiting high reliability even under severe use conditions. In a ball screw device where a screw shaft and a nut member are screwed to each other through an intermediation of a large number of balls, a no-load ball path which forms an infinite circulation path for the balls is constituted by a no-load ball groove spirally formed in an inner peripheral surface of a through-hole of the nut member and by a pair of direction change grooves which communicatively couple a load rolling groove and the no-load ball groove to each other so as to complete the infinite circulation path as a closed loop.

9 Claims, 8 Drawing Sheets

BALL SCREW DEVICE

TECHNICAL FIELD

The present invention relates to a ball screw device in which a nut member and a screw shaft are rotatably engaged with each other through an intermediation of a large number of balls arranged therebetween so as to convert a rotation of a steering shaft to an axial movement of a relay rod in an automobile, for example. In particular, the present invention relates to a ball screw device having a structure suitable for a so-called large lead type in which an axial moving amount of a screw shaft during one rotation of a nut member is set to be large.

BACKGROUND ART

In a known example of a ball screw device for converting a rotational movement to a linear movement or converting a linear movement to a rotational movement, a nut member and a screw shaft are rotatably engaged with each other through an intermediation of a large number of balls. A rolling groove for the balls is spirally formed in an outer peripheral surface of the screw shaft at a predetermined lead, and also a through-hole into which the screw shaft is inserted is formed to the nut member. A load rolling groove facing the rolling groove of the screw shaft is formed in an inner peripheral surface of the through-hole. With the load rolling groove of the nut member and the rolling groove of the screw shaft facing each other, a spiral load ball path is formed between the nut member and the screw shaft, and the balls are rolled while bearing a load acting between the nut member and the screw shaft in the load ball path. With this structure, a relative spiral movement can be performed between the nut member and the screw shaft. Further, the nut member is provided with a no-load ball path for communicatively coupling the both ends of the load ball path, and the balls rolled in the load ball path are returned to the load ball path through the no-load ball path so as to circulate. That is, the nut member is provided with an infinite circulation path for the balls, and the balls circulate in the load ball path and the no-load ball path, whereby the nut member can be continuously moved with respect to the screw shaft.

As methods of providing the nut member with an infinite circulation path for the balls, there are known three dominant methods as follows. The first method is a so-called return tube method involving mounting a return tube formed in a substantially U-shape to the nut member. In this method, the return tube is mounted to the nut member so as to cross over several grooves of the spiral load ball path, and the balls are caused to circulate from one end to the other end of the load ball path through the no-load ball path provided to the return tube (JP 2005-003106 A and the like).

Further, the second method is a so-called deflector method involving embedding a die referred to as a deflector in a nut member. The deflector is provided with a ball returning groove so as to face the screw shaft and cross over ungrooved portions of the screw shaft, and the ball returning groove couples the end portions to each other of a single groove of the load ball path around the screw shaft. With this structure, when the balls having been rolled in the load ball path reach the mounting position of the deflector, the balls are guided into the ball returning groove so as to depart from the rolling groove of the screw shaft and climb over the ungrooved portion of the screw shaft, and then returned to the inlet of the load ball path (JP 2006-038099 A and the like).

Further, the third method is a so-called end cap method. In this end cap method, the nut member is passed through so as to form the ball returning path in the axial direction and is provided with end caps including direction change paths for the balls at both axial ends of the nut member, and the balls having been rolled in the load ball groove are guided into the ball returning path of the nut member via the direction change paths. That is, the end portions of the load ball path are coupled to the end portions of the no-load ball path by means of the direction change paths provided with the end caps, whereby the infinite circulation path for the balls is realized (JP 2005-042796 A and the like).

Patent Document 1: JP 2005-003106 A
Patent Document 2: JP 2006-038099 A
Patent Document 3: JP 2005-042796 A

DISCLOSURE OF THE INVENTION

Problems to be Solved by the Invention

Among the three ball circulation methods, the end cap method is the most suitable for increasing the lead of the screw shaft. This is because, basically in the deflector method, the deflector embedded in the nut member is provided so as to cross over the adjacent rolling grooves, and hence the screw shaft with a large lead cannot be dealt with. Further, this is also because, in the return tube method, it is necessary to set the entire length of the return tube extremely large, and hence it is difficult to deal with the screw shaft with a large lead when taking into consideration the working accuracy of the return tube and the mounting accuracy thereof to the nut member. In view of this, the end cap method is adopted for almost all the generally used ball screw devices with a large lead.

Further, in an example of the use mode of the ball screw device, the rotary power is input to the nut member from a motor or the like, and the screw shaft is moved in the axial direction in accordance with the rotation of the nut member. Conventionally, examples of a ball screw device suitable for the use mode described above include a rotary ball screw device in which an outer race of the rotary bearing is mounted to the outer peripheral portion of the nut member through the intermediation of the balls. In this rotary ball screw device, the nut member is used as an inner race of the rotary bearing, and hence it is necessary to form the circular rolling groove for the balls in the outer peripheral surface of the nut member. However, in the return tube method or the deflector method, the rolling groove cannot be formed in the outer peripheral surface of the nut member owing to the return tube or the deflector being an obstacle. Therefore, the end cap method is adopted in the rotary ball screw device.

However, in the end cap method, it is necessary to pass through the nut member so as to form the ball returning path in the axial direction thereof, and hence the outer diameter of the nut member becomes excessively larger than the outer diameter of the screw shaft. Therefore, in the ball screw device of the end cap method, it is difficult to achieve downsizing and weight-saving of the nut member. This is a significant problem in the rotary ball screw device, that is, in the ball screw device in which the rotary bearing is mounted outside the nut member.

Further, in the end cap method, it is necessary to screw a pair of end caps at both axial ends of the nut member. In addition, the end caps are manufactured with use of a synthetic resin in almost all the cases owing to the direction change paths of complicated configurations provided thereto. Thus, it is difficult to ensure the reliability for the use in which durability is required.

Further, in the conventional ball screw device, it is necessary to mount the return tube, the deflector, or the end caps to the nut member. Therefore, the production cost thereof is high owing to a large number of components and the time and effort involved in assembly.

Meanwhile, the rotary power is input to the nut member in the rotary ball screw device, and hence it would be convenient if the gear is integrally formed at the axial end portion of the nut member. However, a pair of end caps are mounted at both axial ends of the nut member in the end cap method, and hence it is difficult to form the gear at the end portion of the nut member. Even when the gear is formed, the diameter of the gear is inevitably large so as to be apart from the end caps, with the result that there arises a problem of increase in size and weight of the nut member.

Means for Solving the Problems

The present invention has been made in view of the above-mentioned problems. It is therefore an object of the present invention to provide a ball screw device having a novel ball circulation structure suitable for a screw shaft with a large lead, optimum for downsizing and weight saving of a nut member, capable of being manufactured at low cost, and capable of exhibiting high reliability even under severe use conditions.

Further, it is another object of the present invention to provide a ball screw device provided with a ball circulation structure optimum for a rotary ball screw device.

A ball screw device according to the present invention includes:

a large number of balls;

a screw shaft in which a rolling groove for the balls are spirally formed at predetermined leads; and a nut member including a through-hole into which the screw shaft is inserted, the through-hole having an inner peripheral surface provided with a load rolling groove which faces the rolling groove of the screw shaft. The load rolling groove of the nut member and the rolling groove of the screw shaft cooperate with each other so as to form between the nut member and the screw shaft a spiral load ball path in which the balls are rolled. Further, the nut member is provided with a no-load ball path which forms an infinite circulation path for the balls while both ends of the load ball path are communicatively coupled to each other.

The no-load ball path is constituted by a no-load ball groove spirally formed in the inner peripheral surface of the through-hole of the nut member and by a pair of direction change grooves which communicatively couple the load rolling groove and the no-load ball groove to each other so as to complete the infinite circulation path as a closed loop. In other words, the no-load ball groove and the load rolling groove are formed as a multiple thread screw in the inner peripheral surface of the through-hole of the nut member.

The no-load ball groove faces an ungrooved portion except the spiral rolling groove formed on the screw shaft, that is, faces a land portion between the rolling groove and the rolling groove adjacent to each other in the axial direction so as not to hinder the rolling of the balls in the load ball path. With this structure, the balls rolled in the no-load ball groove are retained in the no-load ball groove. As described above, the no-load ball path is constituted by the cooperation of the spiral no-load ball groove provided to the nut member and the ungrooved portion of the screw shaft, and the balls are rolled in the no-load ball path while in contact with the ungrooved portion of the screw shaft.

The direction change grooves are formed at the positions facing the screw shaft, and cause the balls rolled in the rolling grooves of the screw shaft to depart from the rolling grooves and to convert the traveling direction of the balls such that the balls are guided into the no-load ball groove. With this structure, the infinite circulation path as a closed loop in which the balls are circulated is completed.

In order to cause the balls to depart from the rolling grooves of the screw shaft such that the balls are lifted onto the ungrooved portion of the screw shaft, the direction change grooves are formed to become gradually deeper from the load rolling groove to the no-load ball groove so as to continuously couple the load rolling groove and the no-load ball groove to each other without steps.

As a matter of course, it is unnecessary to form the direction change grooves directly in the inner peripheral surface of the through-hole of the nut member. For example, the direction change grooves may be formed in a member other than the nut member such that the other member serves as a deflector to be mounted on the inner peripheral surface of the through-hole of the nut member. However, for ensuring high reliability under severe use environment and achieving manufacturing cost reduction, it is preferable that the direction change grooves be formed directly in the inner peripheral surface of the through-hole of the nut member by cutting with use of an end mill or by grinding.

The ball screw device according to the present invention may be applied not only in the case where only a single rolling groove is formed in the screw shaft, but also in the case where a plurality of rolling grooves are formed in the screw shaft. For example, in the case where a single rolling groove is formed in the screw shaft, a single load rolling groove and a single no-load ball groove are formed in the inner peripheral surface of the through-hole of the nut member, which constitute two threaded screw. Meanwhile, in the case where two rolling grooves are formed in the screw shaft, two load rolling grooves and two no-load ball grooves are formed in the inner peripheral surface of the through-hole of the nut member, which constitute four threaded screw.

REFERENCE NUMERALS

1 . . . ball screw device, 2 . . . screw shaft, 3 . . . nut member, 4 . . . ball, 20a, 20b . . . rolling groove, 32a, 32b . . . load rolling groove, 33a, 33b no-load ball groove, 34 . . . direction change groove

BEST MODE FOR CARRYING OUT THE INVENTION

In the following, a ball screw device according to the present invention is described in detail with reference to the attached drawings.

Figure 1:
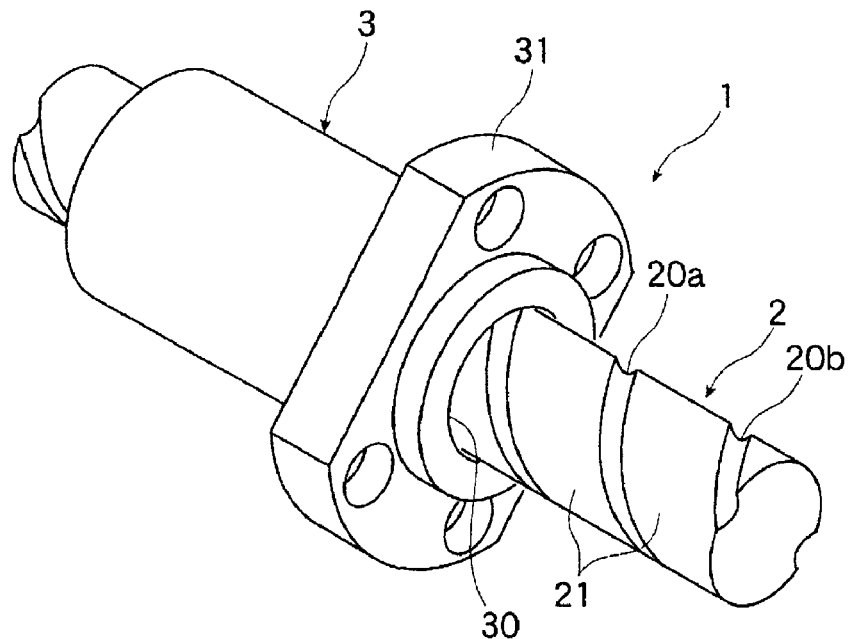
FIG. 1 is a perspective view of a ball screw device according to an embodiment of the present invention.
Figure 2:
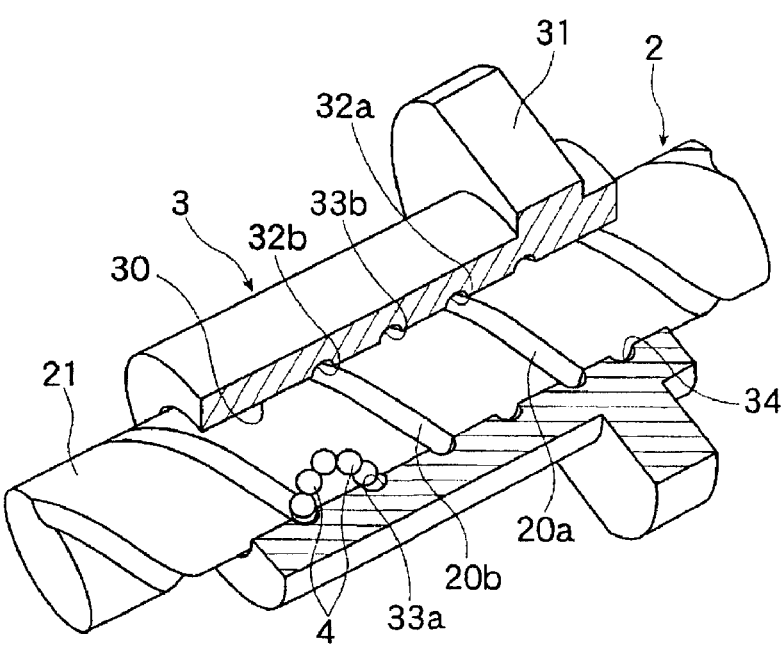
FIG. 2 is a perspective view of the ball screw device of FIG. 1 in which a nut member is cut away.

FIGS. 1 and 2 illustrate an example of a ball screw device according to the present invention. FIG. 1 is a perspective view of the appearance thereof, and FIG. 2 is a perspective view in which a nut member is partially cut away.

In a ball screw device 1, a screw shaft 2 and a nut member 3 are screwed to each other through an intermediation of a large number of balls 4, the screw shaft 2 having an outer peripheral surface on which a rolling groove 20 for the balls 4 is spirally formed at a predetermined lead. Herein, the lead refers to a distance by which the rolling groove 20 proceeds in the axial direction of the screw shaft 2 in accordance with one rotation of the screw shaft 2. The ball rolling groove 20 is formed such that two curved surfaces are intersect substantially at 90 degrees with each other, and has a sectional configuration of Gothic arch in a direction orthogonal to the traveling direction of the balls 4. Thus, the balls 4 are held in contact at two points with the ball rolling groove 20 having the configuration of Gothic arch so as to form the contact angles of approximately 45 degrees with respect to the load acting in the axial direction of the screw shaft 2. In the example illustrated in FIGS. 1 and 2, the screw shaft 2 is provided with two rolling grooves 20a and 20b so as to constitute a multiple thread screw. Further, an ungrooved portion 21 of the screw shaft is formed between the rolling groove 20a and the rolling groove 20b adjacent to each other in the outer peripheral surface of the screw shaft 2.

Note that, FIG. 2 does not illustrate all the balls arranged between the screw shaft and the nut member, but illustrates only a part of the balls.

Figure 3:
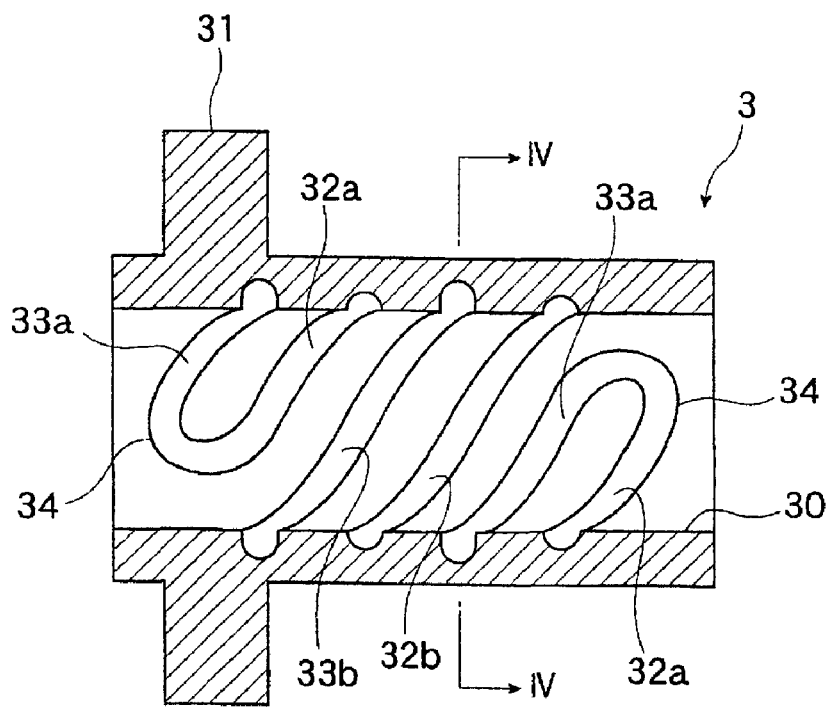
FIG. 3 is a sectional view of the nut member of the ball screw device of the embodiment.
Figure 4:
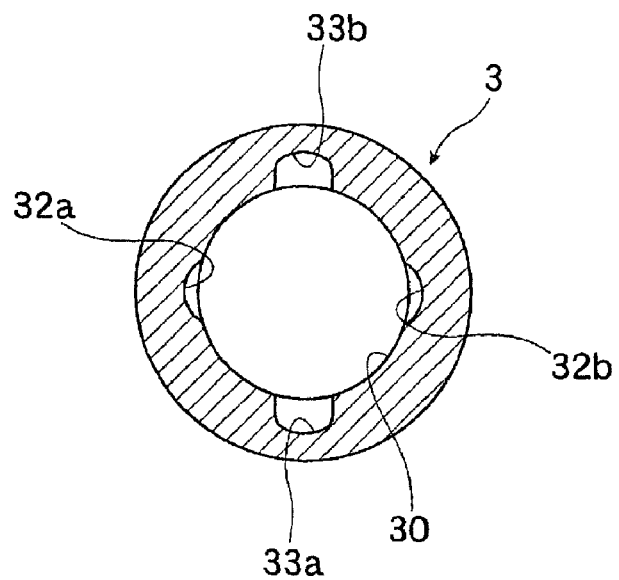
FIG. 4 is a sectional view taken along the line IV-IV of FIG. 3.

The nut member 3 is formed in a substantially cylindrical shape so as to include a through-hole 30 into which the screw shaft 2 is inserted, and the outer peripheral surface thereof is provided with an upright flange portion 31 for fixing the nut member 3 to the mechanical apparatus. FIG. 3 is a sectional view of the nut member 3, which is obtained while taken in the axial direction. As illustrated in the figure, the inner peripheral surface of the through-hole 30 of the nut member 3 is spirally provided with load rolling grooves 32a and 32b facing the rolling grooves 20a and 20b of the screw shaft 2. The sectional configuration of the load rolling grooves 32a and 32b, which is formed in the direction orthogonal to the traveling direction of the balls 4, is the same as the sectional configuration of the rolling groove 20 of the screw shaft 2. Those load rolling grooves 32a and 32b and the rolling grooves 20a and 20b of the screw shaft 2 are faced to each other, whereby a spiral load ball path in which the balls 4 revolve around the screw shaft 2 while bearing a load is formed between the nut member 3 and the screw shaft 2.

Further, two no-load ball grooves 33a and 33b are spirally formed in the inner peripheral surface of the through-hole 30 of the nut member 3. Those no-load ball grooves 33a and 33b are formed to be deeper into the inner peripheral surface of the through-hole than the load rolling grooves, and to have a groove width slightly larger than the diameters of the balls. Thus, the balls enter a no-load state without bearing a load in the no-load ball grooves, and are freely rolled while pressed by subsequent balls.

The no-load ball groove 33a and the load rolling groove 32a are formed in pair, and the no-load ball groove 33b and the load rolling groove 32b are formed in pair. That is, the load rolling groove 32a, the no-load ball groove 33a, the load rolling groove 32b, and the no-load ball groove 33b are formed in the stated order in the inner peripheral surface of the through-hole 30 of the nut member 3 so as to constitute a multiple thread screw. Since the load rolling grooves 32a and 32b face the rolling grooves 20a and 20b of the screw shaft 2, the no-load ball grooves 33a and 33b face the ungrooved portion 21 of the screw shaft 2 formed between the rolling groove 20a and the rolling groove 20b, and the balls 4 rolled in the no-load ball grooves 33a and 33b in a no-load state are brought into contact with the ungrooved portion 21 of the screw shaft 2. With this structure, the balls 4 are retained in the no-load ball grooves 33a and 33b. Accordingly, in the ball screw device 1, the no-load ball grooves 33a and 33b and the ungrooved portion 21 of the screw shaft 2 cooperate with each other so as to constitute a no-load ball path.

Meanwhile, in the inner peripheral surface of the through-hole 30 of the nut member 3, substantially U-shaped direction change grooves 34 are formed near both the ends of the nut member in the axial direction. The direction change grooves 34 communicatively couple the end portion of the load rolling groove 32a and the end portion of the no-load ball groove 33a to each other, and communicatively couple the end portion of the load rolling groove 32b and the end portion of the no-load ball groove 33b to each other. In the nut member 3 provided with two load rolling grooves, the direction change grooves 34 are formed at four portions on the inner peripheral surface of the through-hole 30. Note that, when a single load rolling groove is provided to the nut member 3 instead of two load rolling grooves, the direction change grooves 34 are formed at two portions on the inner peripheral surface of the through-hole 30.

Figure 5:
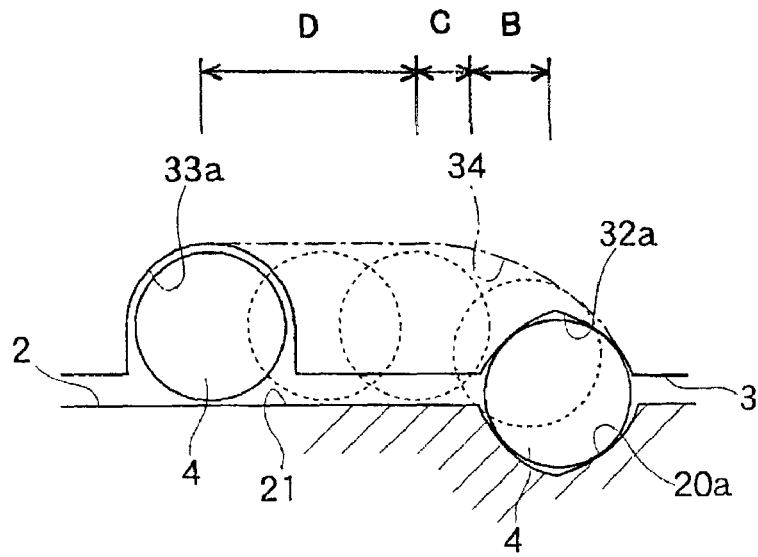
FIG. 5 is an enlarged sectional view illustrating a state where balls are moved between a load rolling groove and a no-load ball groove.

The direction change grooves 34 are continuously formed without steps from the end portions of the load rolling grooves 32a and 32b to the end portions of the no-load ball grooves 33a and 33b so as to become gradually deeper from the end portions of the load rolling grooves 32a and 32b toward the end portions of the no-load ball grooves 33a and 33b. FIG. 5 illustrates the ball 4 which enters the direction change groove 34 after being rolled in the load rolling groove 32a and is guided in the direction change groove 34 so as to depart from the rolling groove 20a of the screw shaft 2. When reaching the connected portion between the load rolling groove 32a and the direction change groove 34, the balls 4 rolled in the load rolling groove 32a are gradually released from the loads because the load rolling groove 32a becomes gradually deeper. The balls 4 released from the loads are pushed by the subsequent balls 4 so as to successively advance in the rolling groove 20a of the screw shaft 2. The direction change groove 34 leads the balls 4 to the side of the rolling groove 20a, and hence the balls 4 climb up the rolling groove 20a so as to be lifted onto the ungrooved portion 21 of the screw shaft 2, and then are completely accommodated in the direction change groove 34 of the nut member 3.

The direction change groove 34 includes a substantially U-shaped track, and hence the balls 4 accommodated in the direction change groove 34 are rolled in the inverse direction so as to enter the no-load ball path formed by the no-load ball groove 33a of the nut member 3 and the ungrooved portion 21 of the screw shaft 2 facing each other. The balls 4 are in the no-load state in the no-load ball path so as to advance in the no-load ball path while pushed by the subsequent balls 4.

Further, when, after advancing in the no-load ball path, the balls 4 reach the connected portion between the no-load ball groove 33a and the direction change groove 34, the balls 4 successively enter the direction change groove so as to invert the travelling direction again, and then enter the load ball path formed by the rolling groove 20a of the screw shaft 2 and the load rolling groove 32a of the nut member 3 facing each other. In this case, the balls 4 climb down the side of the rolling groove 20a of the screw shaft 2 so as to enter the load ball path, and when the load rolling groove 32a becomes gradually shallower at the connected portion between the direction change groove 34 and the load rolling groove 32a, the no-load state shifts to the load-bearing state.

That is, in the ball screw device 1, the direction change grooves 34 communicatively couple the end portions of the load rolling grooves 32a and 32b and the end portions of the no-load ball grooves 33a and 33b of the nut member 3 to each other, whereby the infinite circulation path as a closed loop for the balls 4 is provided with the nut member 3. When a relative spiral movement occurs between the nut member 3 and the screw shaft 2, the balls 4 circulate in the infinite circulation path so as to continuously perform the spiral movement.

Figure 6:
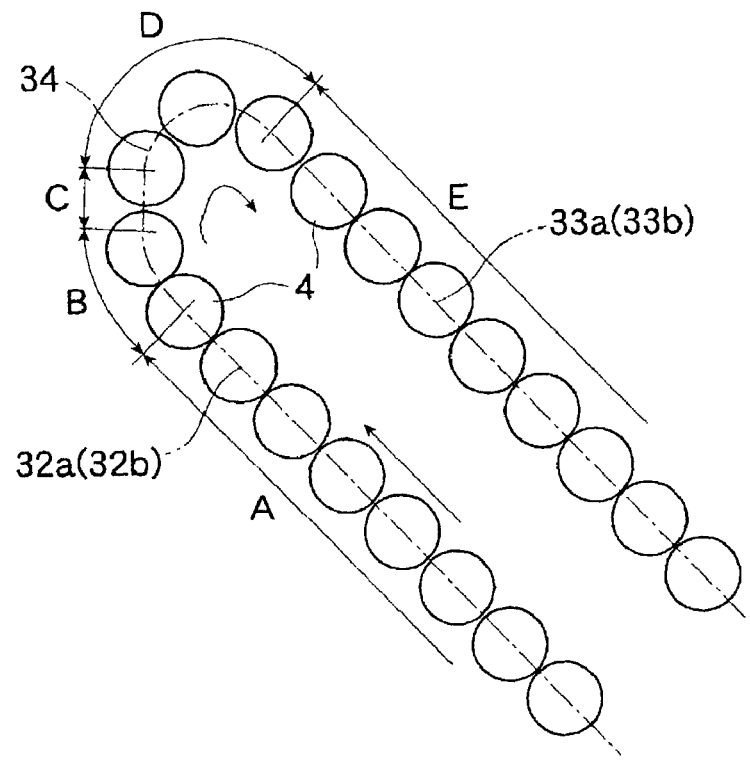
FIG. 6 is a plan view illustrating a trace of the balls in an infinite circulation path including a direction change groove.

FIG. 6 is a plan view illustrating a track of the balls 4 in the direction change groove 34 and the vicinity thereof. A region A illustrates a trace of the balls 4 in the load ball path. In the region A, the balls 4 are rolled between the rolling grooves 20a and 20b of the screw shaft 2 and the load rolling grooves 32a and 32b of the nut member 3 while bearing a load. Further, a region E illustrates a trace of the balls 4 in the no-load ball grooves 33a and 33b. In the region E, the balls 4 are rolled between the ungrooved portion 21 of the screw shaft 2 and the no-load ball grooves 33a and 33b in the no-load state. Regions B, C, and D each illustrate a trace of the balls 4 in the direction change groove 34. Each of the traces in the regions B and D is set to have a curved shape of a predetermined curvature, and the trace in the region C is set to have a linear shape so as to be smoothly continuous with the curved traces in the regions B and D.

Description made with reference to both FIGS. 5 and 6 shows the following. The region B is a ball deflection region in which the balls 4 depart from the rolling grooves 20a and 20b of the screw shaft 2, and the balls 4 entering the region B from the region A are led to the one side of the rolling grooves 20a and 20b of the screw shaft 2 in the region B, and climb up the rolling grooves 20a and 20b so as to be lifted onto the ungrooved portion 21 of the screw shaft 2. Meanwhile, the region D is a ball turning region in which the balls 4 lifted onto the ungrooved portion 21 of the screw shaft 2 are guided into the no-load ball grooves 33a and 33b, and is formed in a circular-arc shape at a constant turning radius. The turning radius of the balls 4 in the ball turning region is set approximately once to twice as large as the diameter of the balls 4. The balls 4 are liable to get caught in the direction change groove 34 when the turning radius is set to be smaller than the above-mentioned diameter of the balls 4. Further, the intervals between the load rolling grooves 32a and 32b and the no-load ball grooves 33a and 33b are excessively large when the turning radius is set to be larger than the above-mentioned diameter of the balls 4, with the result that the nut member 3 cannot be compactly formed. Further, the region C is a ball delivery region for coupling the ball deflection region B and the ball turning region D, and is formed in a linear shape as a tangent with respect to the circular-arc shaped traces of both the ball deflection region B and the ball turning region D. With this structure, the rolling state of the balls 4 entering the ball delivery region C from the ball deflection region B, or of the balls 4 entering the ball delivery region C from the ball turning region D is stabilized in the ball delivery region C, and then the balls 4 enter the subsequent region, with the result that the occurrence of the ball clogging is prevented in the direction change groove 34.

Figure 7:
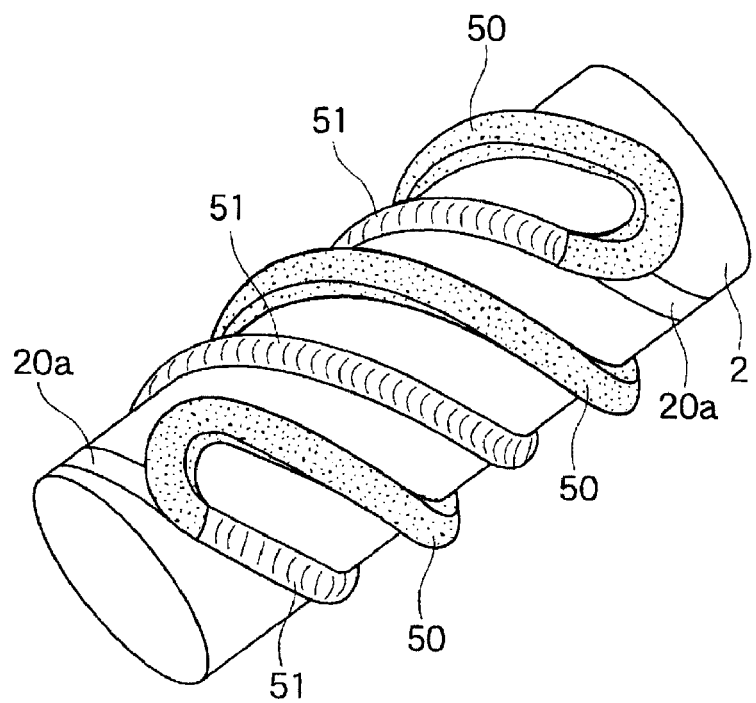
FIG. 7 is a schematic perspective view of an infinite circulation path for the balls of the embodiment, which is formed around a screw shaft.
Figure 8:
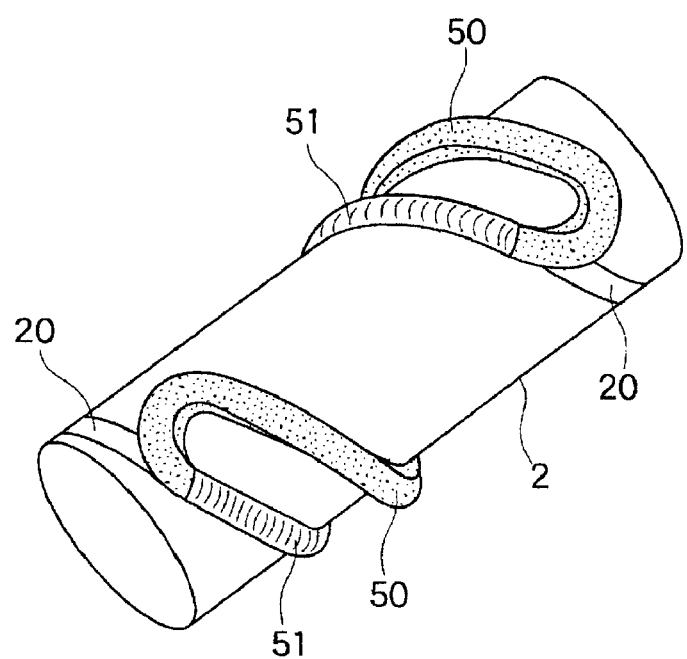
FIG. 8 is a schematic perspective view of the infinite circulation path for the balls formed around the screw shaft in the case where a single load rolling groove is provided.

FIG. 7 schematically illustrates the infinite circulation path around the screw shaft 2. The halftone dot region illustrates no-load ball tracks 50 formed of the no-load ball grooves 33a and 33b and the direction change grooves 34, and the stripe region illustrates load ball tracks 51 formed of the load rolling grooves 32a and 32b. As illustrated in the figures, the no-load ball tracks 50 and the load ball tracks 51 are formed like multiple thread screws around the screw shaft 2 in the ball screw device 1 of the present invention. Note that, FIG. 7 illustrates the case where the rolling grooves 20a and 20b of the screw shaft 2 are formed as double-thread screws. For example, when a single rolling groove 20 of the screw shaft 2 is provided, the infinite circulation path for the balls 4 is formed around the screw shaft 2 as illustrated in FIG. 8.

Figure 9:
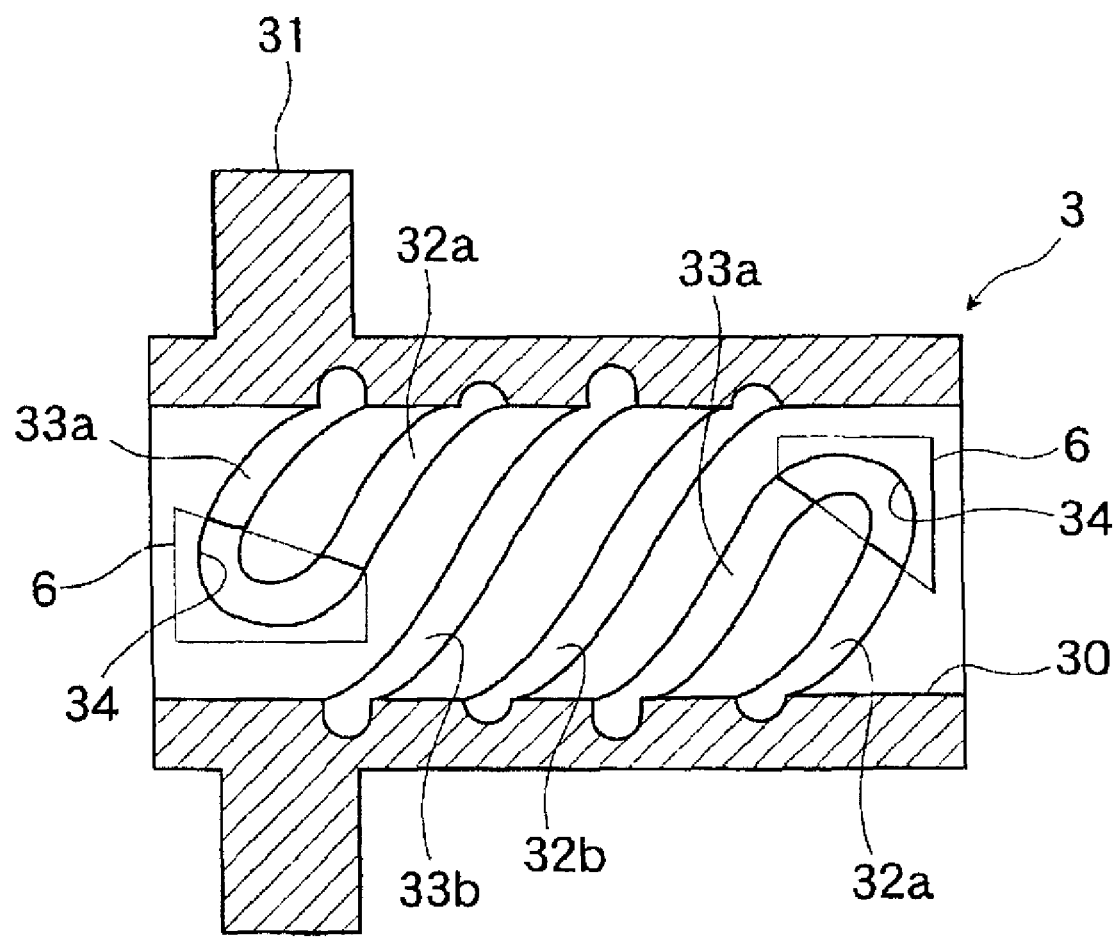
FIG. 9 is a sectional view of an example in which a deflector provided with the direction change groove is mounted to the nut member.

Note that, in the example illustrated in FIGS. 1 to 3, the direction change grooves 34 are directly formed in the inner peripheral surface of the through-hole 30 of the nut member 3 by cutting with use of an end mill as well as the load rolling grooves 32a and 32b and the no-load ball grooves 33a and 33b. However, as illustrated in FIG. 9, a plurality of deflectors 6 provided with the direction change grooves 34 are fitted to the inner peripheral surface of the through-hole 30 of the nut member 3, whereby the load rolling grooves 32a and 32b, the direction change grooves 34, and the no-load ball grooves 33a and 33b may be communicatively coupled to one another.

In the ball screw device 1 according to the present invention structured as described above, the no-load ball grooves 33a and 33b of the nut member 3 are formed to be positioned so as to face the ungrooved portion 21 of the screw shaft 2. Thus, it is necessary that the interval between the rolling groove 20a and the rolling groove 20b adjacent to each other on the screw shaft 2, that is, the width of the ungrooved portion 21 be larger than the diameter of the balls 4. Therefore, the ball screw device 1 of the present invention is suitable for a so-called ball screw device of a large lead type in which a lead is set to be large.

Further, in the present invention, the no-load ball grooves 33a and 33b constituting a no-load ball path are spirally formed in the inner peripheral surface of the through-hole 30 of the nut member 3 while facing the ungrooved portion 21 of the screw shaft 2. Therefore, unlike a conventional ball screw device of an end cap type, it is unnecessary to pass through the nut member so as to form a ball returning path in the axial direction thereof, to thereby set to be smaller the thickness of the nut member. With this structure, the nut member can be more compactly manufactured in the ball screw device of the present invention as compared with the ball screw device of the end cap type.

Further, when all of the load rolling grooves 32a and 32b, the no-load ball grooves 33a and 33b, and the direction change grooves 34 are directly formed in the inner peripheral surface of the through-hole 30 of the nut member 3 by cutting, grinding, or the like, it is unnecessary to mount any other components to the nut member 3 upon provision of the infinite circulation path for the balls 4 to the nut member 3. As a result, the production of the ball screw device can be facilitated and performed at low cost. In addition, the infinite circulation path for the balls 4 can be formed without fixing any other components to the nut member 3, and hence high reliability can be achieved even under severe use environment for a long period of time.

Further, in the ball screw device 1 illustrated in FIGS. 1 to 3, it is unnecessary to mount any components with which the infinite circulation path for the balls 4 is formed to the nut member 3. Therefore, the outer peripheral surface of the nut member 3 can be freely worked. For example, the ball screw device 1 can easily be converted into a so-called rotary ball screw device used while the rotary power is input to the nut member thereof. In that case, a rolling groove for balls is formed on the outer peripheral surface of the nut member 3 in the circumferential direction thereof, and an outer race of the rotary bearing is attached to the nut member 3 through an intermediation of a large number of balls rolled in the rolling groove. As described above, the outer diameter of the nut member 3 can be reduced in the ball screw device of the present invention. Thus, the ball screw device can be downsized even in the case of constituting the rotary ball screw device.

Further, in the case of constituting the rotary ball screw device, it is preferable that a gear for inputting the rotary power to the nut member 3 be formed at the end portion of the nut member 3. In a conventional ball screw device of an end cap type, an end cap is mounted to the end portion of the nut member. Thus, even when the gear is formed to the nut member, it is necessary to form the gear apart from the end cap, which leads to the disadvantage of natural increase in diameter of the gear. However, it is unnecessary to mount any components to the end portion of the nut member 3 in the ball screw device 1 of the present invention, and hence the gear can be formed integrally with the end portion of the nut member 3 without any restrictions. In this regard also, the rotary ball screw device can be downsized.

Figure 10:
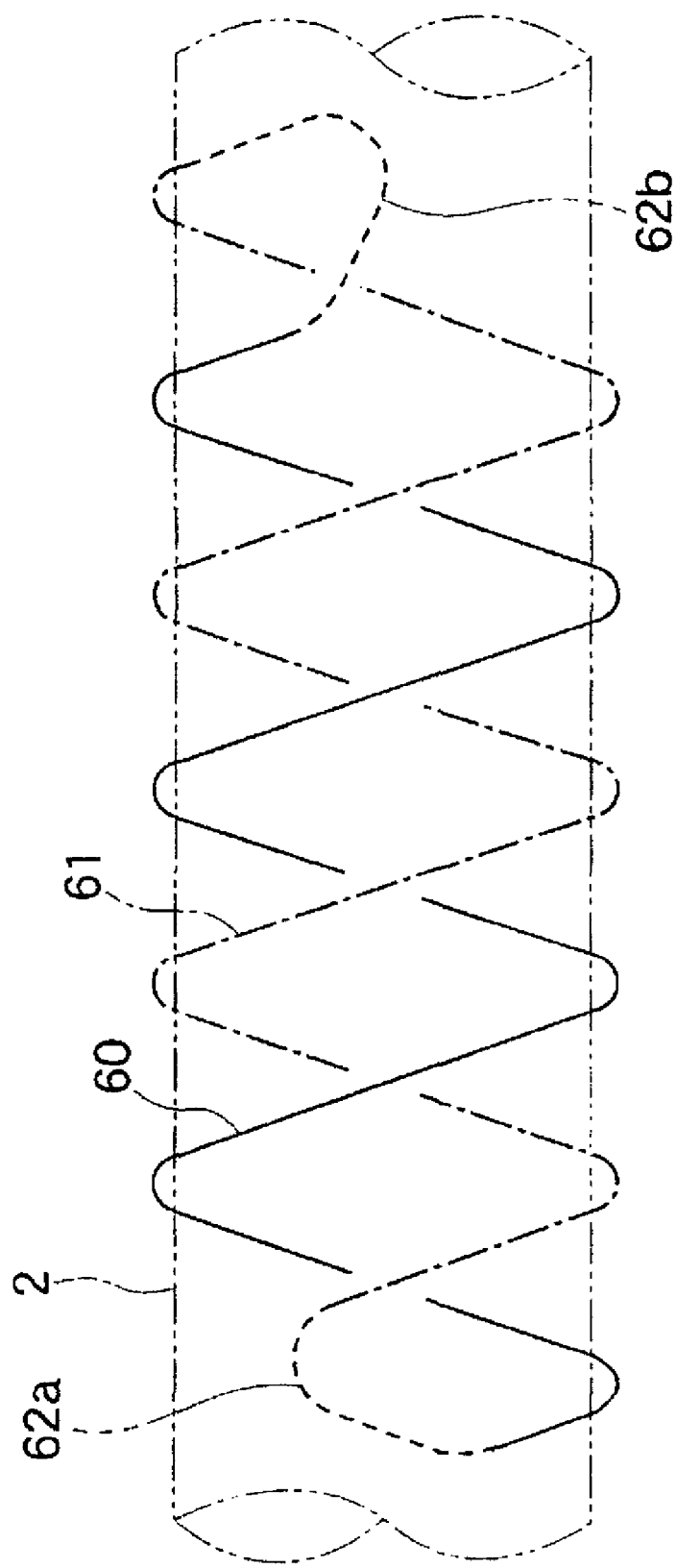
FIG. 10 is a schematic view of an example of the infinite circulation path for the balls around the screw shaft.

FIG. 10 is a schematic view of an example of the infinite circulation path for the balls 4 around the screw shaft 2, and illustrates an example in which only a single rolling groove is formed in the outer peripheral surface of the screw shaft 2. A solid line in the drawing illustrates the track of the balls 4 rolled in a load rolling groove 60 of the nut member 3, a dashed line in the drawing illustrates the track of the balls 4 rolled in a no-load ball groove 61 of the nut member 3, and broken lines in the drawing illustrate the tracks of the balls 4 rolled in direction change grooves 62a and 62b of the nut member 3.

The load rolling groove 60 and the no-load ball groove 61 are spirally formed with the same lead, and the no-load ball groove 61 is formed while displaced with respect to the load rolling groove 60. In the example illustrated in FIG. 10, the load rolling groove 60 and the no-load ball groove 61 are formed to have substantially the same length with each other, and direction change grooves 62a and 62b each couple the load rolling groove and the no-load ball groove positioned adjacently on the right side thereto in the sheet. With this structure, an infinite circulation path for the balls 4 is constituted so as to serve as a closed loop in which the balls 4 are circulated in the load rolling groove 60, the direction change groove 62a, the no-load ball groove 61, and the direction change groove 62b in the stated order. An infinite circulation path having the same structure as described above is also equipped with the ball screw device illustrated in FIGS. 1 to 3 while, as clearly understood from the load rolling grooves 32a and 32b illustrated therein, the number of the load rolling grooves formed in the inner peripheral surface of the nut member 3 are different from each other.

Figure 11:
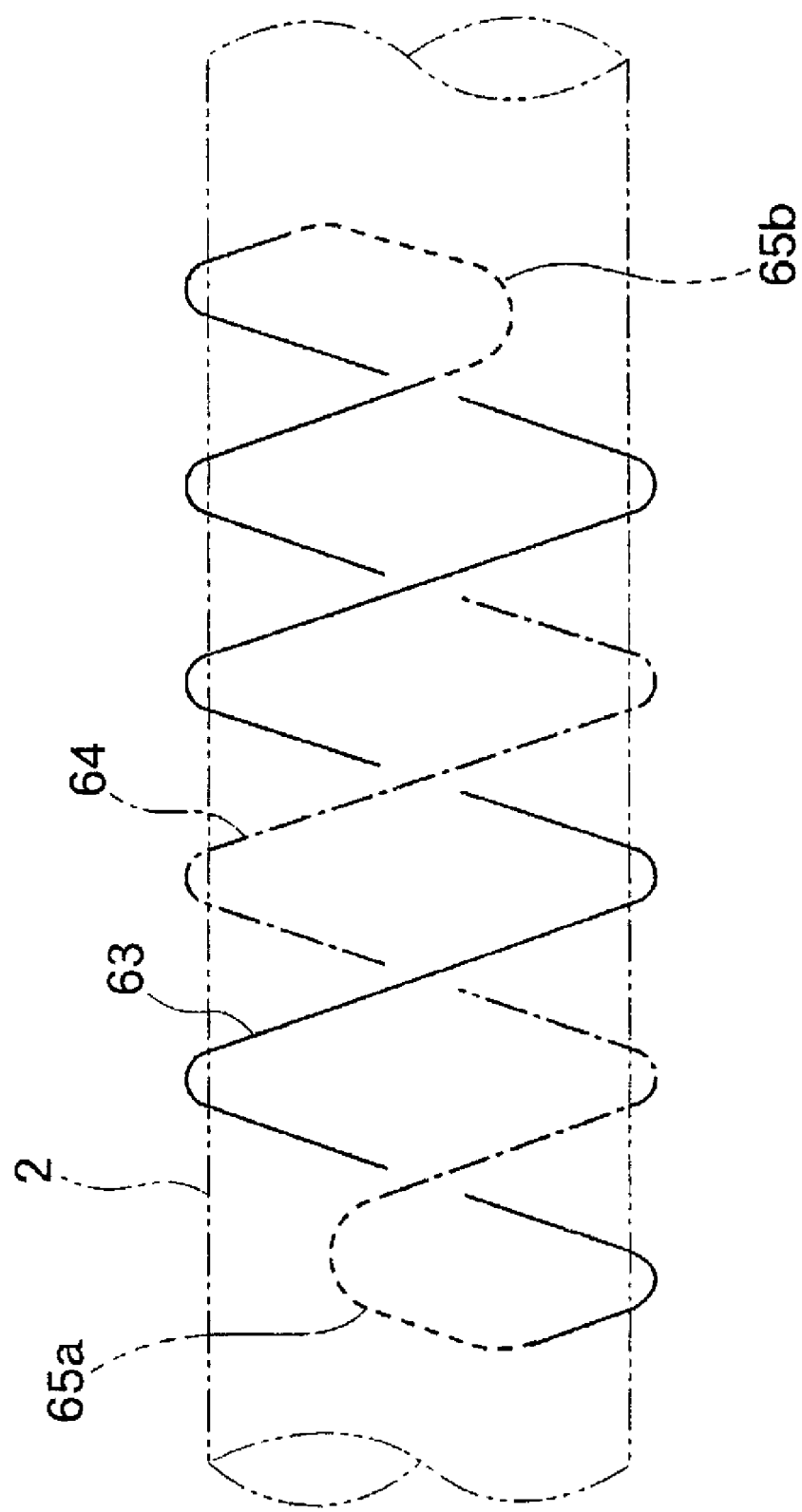
FIG. 11 is a schematic view of another example of the infinite circulation path for the balls around the screw shaft.

Meanwhile, FIG. 11 is a schematic view of another example of the infinite circulation path for the balls 4 around the screw shaft 2. In this example illustrated in FIG. 11 as well, a solid line illustrates the track of the balls 4 rolled in a load rolling groove 63 of the nut member 3, a dashed line in the drawing illustrates the track of the balls 4 rolled in a no-load ball groove 64 of the nut member 3, and broken lines in the drawing illustrate the tracks of the balls 4 rolled in direction change grooves 65a and 65b of the nut member 3. Note that, in this example, the following points are different from the infinite circulation path illustrated in FIG. 10: the length of the no-load ball groove 64 is smaller than that of the load rolling groove 63, and the direction change grooves 65a and 65b couple the end portions of the load rolling groove to the no-load ball groove 64 adjacent to the load rolling groove 63 on an inner side of the nut member 3.

In the infinite circulation path illustrated in FIG. 10, the direction change grooves 62a and 62b have configurations different from each other, and hence it takes time and effort for manufacturing the nut member 3 by that much. However, in the infinite circulation path illustrated in FIG. 11, the direction change grooves 65a and 65b have the same configuration with each other, and hence the nut member 3 can easily be manufactured. Further, the axial length of the nut member 3 can be decreased without reducing the length of the load rolling groove 63, and hence the nut member 3 can compactly be formed. Further, in the latter example, the length of the no-load ball groove 64 is decreased by the length corresponding to the single winding around the screw shaft 2 as compared with the former example. As a result, clogging phenomena of the balls in the no-load ball groove 64 can be suppressed by that much, and hence the smooth circulation of the balls 4 can be expected.

Note that, in the structure of the infinite circulation path illustrated in FIG. 11, the direction change groove 65b returns the balls 4 from the load rolling groove 63 to the no-load ball groove 64 adjacent thereto on the left side in the sheet while the direction change groove 65a guides the balls from the load rolling groove 63 to the no-load ball groove 64 adjacent thereto on the right side in the sheet. Therefore, in the case of forming two or more load rolling grooves 63, it is difficult to form the independent infinite circulation paths for the balls 4, which correspond to the load rolling grooves 63.

Figure 12:
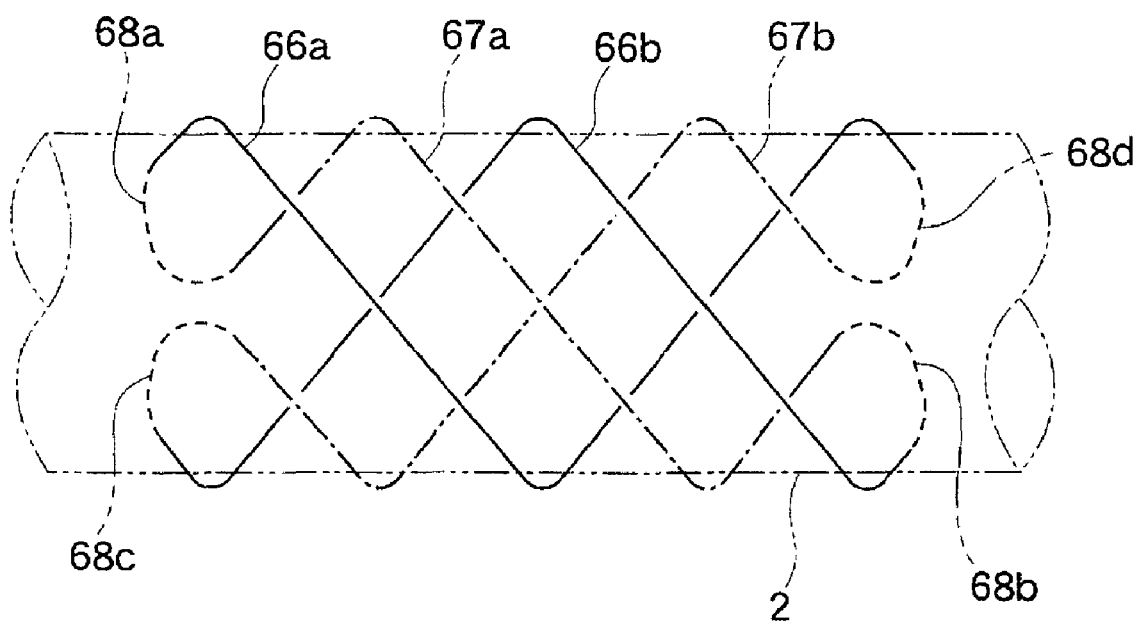
FIG. 12 is a schematic view of an example of the infinite circulation path for the balls in the case where a multiple thread screw is used as the screw shaft.

FIG. 12 illustrates an example of the structure of the infinite circulation path of the FIG. 11 adapted to a multiple thread screw. In this case, two load rolling grooves 66a and 66b are formed in the inner peripheral surface of the nut member 3. In this example illustrated in FIG. 12 as well, solid lines illustrate the tracks of the balls 4 rolled in the load rolling grooves 66a and 66b of the nut member 3, dashed lines in the drawing illustrate the tracks of the balls 4 rolled in no-load ball grooves 67a and 67b of the nut member 3, and broken lines in the drawing illustrate the tracks of the balls 4 rolled in direction change grooves 68a, 68b, 68c, and 68d of the nut member 3.

In the example of multiple thread screw illustrated in FIG. 12, the two load rolling grooves 66a and 66b, the two no-load ball grooves 67a and 67b, and the direction change grooves 68a, 68b, 68c, and 68d at four portions cooperate with each other so as to form an infinite circulation path as a single closed loop. That is, the balls rolled in the load rolling groove 66a move to the no-load ball groove 67a through the direction change groove 68a, and then moves from the no-load ball groove 67a to the load rolling groove 66b through the direction change groove 68b. Next, the balls 4 rolled in the load rolling groove 66b move from the load rolling groove 66b to the no-load ball groove 67b through the direction change groove 68c, and then return to the load rolling groove 66a through the direction change groove 68d.

Even in the case of forming the screw shaft 2 as a multiple thread screw, the structure of the nut member 3 can be simplified and downsized when two or more load rolling grooves and no-load ball grooves are included in a single infinite circulation path as a closed loop as in the example illustrated in FIG. 12, instead of forming the independent infinite circulation paths for the individual load rolling grooves.

The invention claimed is:

1. A ball screw device, comprising:
   a plurality of balls;
   a screw shaft in which a rolling groove for the balls is spirally formed at a predetermined lead; and
   a nut member comprising:
      a through-hole into which the screw shaft is inserted, the through-hole having an inner peripheral surface provided with a load rolling groove which faces the rolling groove of the screw shaft, the load rolling groove and the rolling groove of the screw shaft cooperating with each other so as to form a spiral load ball path; and
      a no-load ball path which forms an infinite circulation path for the balls while both ends of the load ball path are communicatively coupled to each other,
   wherein the no-load ball path is constituted by a no-load ball groove spirally formed in the inner peripheral surface of the through-hole of the nut member and by a pair of direction change grooves which communicatively couple the load rolling groove and the no-load ball groove to each other so as to complete the infinite circulation path as a closed loop, and
   wherein the direction change grooves are formed to become gradually deeper from the load rolling groove to the no-load ball groove so as to continuously couple the load rolling groove and the no-load ball groove to each other without steps.

2. The ball screw device according to claim 1, wherein the no-load ball groove faces an ungrooved portion except the spiral rolling groove formed on the screw shaft.

3. The ball screw device according to claim 1, wherein the no-load ball groove is formed to have a width larger than diameters of the balls.

4. The ball screw device according to claim 1, wherein the direction change grooves are formed in the inner peripheral surface of the through-hole of the nut member.

5. The ball screw device according to claim 1, wherein the load rolling groove and the no-load ball groove adjacent thereto on an inner side of the nut member with respect to the load rolling groove are communicatively coupled to each other by the direction change grooves.

6. The ball screw device according to claim 5, wherein the length of the no-load ball groove is smaller than the length of the load rolling groove.

7. The ball screw device according to claim 1, wherein the direction change grooves comprise:
   a ball deflection region in which the balls depart from the rolling groove of the screw shaft so as to be lifted onto an ungrooved portion of the screw shaft;
   a ball turning region which is formed to have a uniform turning radius and in which the balls positioned at the ungrooved portion of the screw shaft are guided into the no-load ball groove; and
   a ball delivery region for smoothly coupling the ball deflection region and the ball turning region.

8. The ball screw device according to claim 1, wherein:
   the rolling groove of the screw shaft is formed as a multiple thread screw;
   the load rolling groove of the nut member is also formed as a multiple thread screw corresponding to the rolling groove of the screw shaft; and
   the no-load ball groove corresponding to the individual load rolling groove is spirally formed in the inner peripheral surface of the through-hole of the nut member.

9. The ball screw device according to claim 8, wherein the one infinite circulation path as a closed loop comprises two or more of the load rolling grooves and two or more of the no-load ball grooves.

* * * * *